(12) United States Patent
McInnis et al.

(10) Patent No.: US 6,610,831 B1
(45) Date of Patent: Aug. 26, 2003

(54) METHODS AND APPARATUS FOR RECOVERING ZEIN FROM CORN

(75) Inventors: Jerel McInnis, Cordova, TN (US); Qingnong Tang, Saskatoon (CA)

(73) Assignee: Lurgi PSI, Ltd., Memphis, TN (US)

( * ) Notice: Subject to any disclaimer, the term of this patent is extended or adjusted under 35 U.S.C. 154(b) by 0 days.

(21) Appl. No.: 09/469,032

(22) Filed: Dec. 21, 1999

(51) Int. Cl.$^7$ .............................................. C07K 14/415
(52) U.S. Cl. ....................... 530/373; 530/376; 530/422; 530/424; 530/427; 514/2
(58) Field of Search .................... 530/373, 376, 530/422, 424, 427

(56) References Cited

U.S. PATENT DOCUMENTS

| | | |
|---|---|---|
| 456,773 A | 7/1891 | Osborne |
| 696,156 A | 3/1902 | Wulkan |
| 1,992,122 A | 2/1935 | Hansen et al. ............ 428/474.7 |
| 2,105,760 A | 1/1938 | Swallen .................... 106/156.1 |
| 2,120,946 A | 6/1938 | Swallen ....................... 530/373 |
| 2,229,870 A | 1/1941 | Pearce ......................... 530/373 |
| 2,272,488 A | 2/1942 | Swallen ....................... 530/373 |
| 2,287,649 A | 6/1942 | Swallen ....................... 530/373 |
| 2,332,356 A | 10/1943 | Swallen et al. ............. 530/373 |
| 2,354,393 A | 7/1944 | Manley et al. ............. 530/373 |
| 2,854,339 A * | 9/1958 | Fernandez Diez De Sollano ......... 426/462 |
| 3,370,054 A | 2/1968 | Loew ......................... 530/373 |
| 3,519,431 A | 7/1970 | Wayne ....................... 426/417 |
| 3,535,305 A | 10/1970 | Carter et al. ................ 530/373 |
| 3,676,365 A * | 7/1972 | Shirai ......................... 502/424 |
| 3,962,335 A | 6/1976 | Kumar ....................... 426/574 |
| 3,963,575 A | 6/1976 | Bulich ......................... 435/98 |
| 4,224,219 A | 9/1980 | Van Blanton et al. ....... 530/373 |
| 4,486,353 A | 12/1984 | Matsuzaki et al. ............ 554/13 |
| 4,624,805 A | 11/1986 | Lawhon ....................... 530/376 |
| 4,716,218 A | 12/1987 | Chen et al. ................. 530/372 |
| 5,254,673 A | 10/1993 | Cook et al. ................. 530/373 |
| 5,342,923 A | 8/1994 | Takahashi et al. ........... 530/373 |
| 5,367,055 A | 11/1994 | Takahashi et al. ........... 530/373 |
| 5,410,021 A | 4/1995 | Kampen ..................... 530/372 |
| 5,510,463 A | 4/1996 | Takahashi et al. ........... 530/373 |
| 5,580,959 A | 12/1996 | Cook et al. ................. 530/373 |
| 5,773,076 A | 6/1998 | Liaw et al. ................. 426/656 |
| 6,017,753 A * | 1/2000 | Johnson ..................... 435/276 |
| 6,113,975 A * | 9/2000 | Grace ......................... 426/656 |
| 6,217,664 B1 * | 4/2001 | Baniel ......................... 127/53 |

FOREIGN PATENT DOCUMENTS

| | | |
|---|---|---|
| GB | 620011 A | 3/1947 |
| GB | 651396 A | 4/1951 |

OTHER PUBLICATIONS

Deis, R. C. (Food Product Design 7 (2) 97–98, 100, 103–104, 107, 109, 111–113, 1997).*
Hojilla Evangelista, M. P. (Journal of the American Oil Chemists' Society 69 (3) 199–204, 1992).*
Food Process, (Chicago). (1985) 46 (4), 49.*
Shaowen Wu (Cereal Chemistry 74 (3) 268–273, 1997).*
Shaowen Wu (Cereal Chemistry 74 (3) 258–263, 1997).*
Parris, N. (Journal of Agricultural and Food Chemistry 49 (8) 3757–3760, 18, 2001).*
Dombrink–Kurtzman Journal of Cereal Science 19, 57, 1994.*
Bajpai Indian J. Chem. Sect A Inorg Bio–Inorg Phys Theor. Anal. Chem. 36A(9), 783–784, 1997.*
Sequential Extraction Processing of Flaked Whole Corn: Alternative Corn . . . Ethanol Production, Hojilla–Evangelista, et al., vol. 69.No. 6, 1992, pp. 643–647—American Association for Cereal Chemists.

* cited by examiner

Primary Examiner—Christopher S. F. Low
Assistant Examiner—David Lukton
(74) Attorney, Agent, or Firm—Fulbright & Jaworski L.L.P.

(57) ABSTRACT

Methods and apparatus for recovering zein from substrates are disclosed. The method includes extracting a zein-containing substrate such as whole corn with ethanol to yield a crude zein alcoholic dispersion and treating this dispersion with an adsorbent to remove at least one of starch, color or oil to yield a purified zein which is subsequently recovered or used in industrial applications. A preferred adsorbent is activated charcoal.

2 Claims, 2 Drawing Sheets

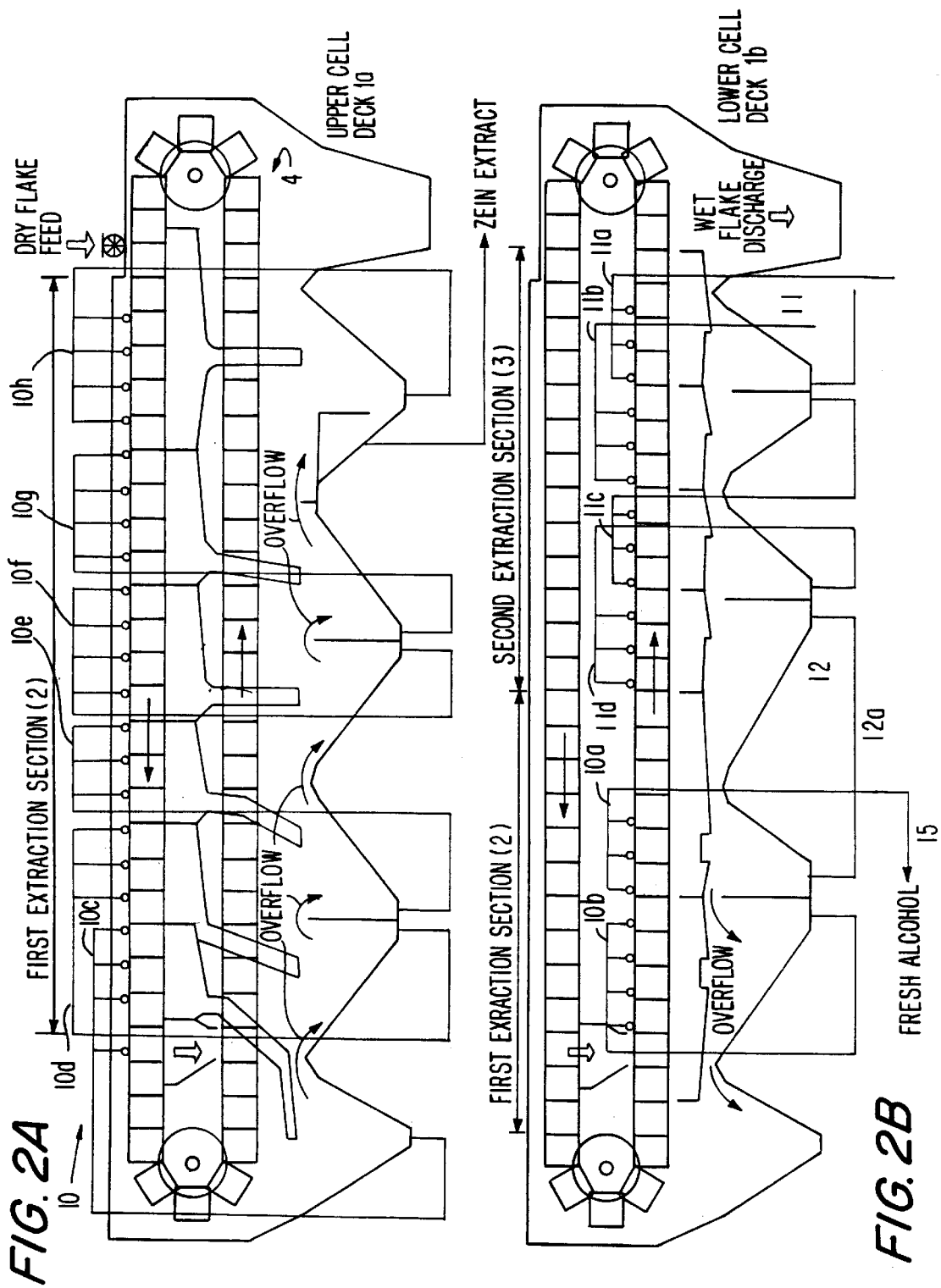

METHODS AND APPARATUS FOR RECOVERING ZEIN FROM CORN

FIELD OF THE INVENTION

The invention provides processes for recovering zein from corn. The processes and apparatus of the invention are designed to be implemented as additional modules in pre-existing ethanol production plants, and can easily be incorporated into new constructions as well.

BACKGROUND OF THE INVENTION

Zein is a protein found in corn, millet (also called milo), rice and other plants which has many applications in industry. Zein has many uses and can be used to make a variety of different products. Much of the zein produced today comes from corn and is used in livestock food as a protein source. Another useful product that can be made from zein is a biodegradable resin (polymer), which can be used as a substitute for existing plastic products, e.g., edible film barriers for food products, or edible food wraps. Zein is also used in the pharmaceutical industry as a tablet coating and in the food industry as a fat replacer. Other uses are likely to be developed, as the availability of zein increases.

There are many known techniques for recovering zein as well as other natural ingredients such as oil, from corn. U.S. Pat. No. 4,716,218 to Chen et al. describes a process for producing grain oil, dehydrated alcohol, grain protein such as zein and starch utilizing ethanol extraction. The process for the production of grain oil and dehydrated alcohol by cracking the grain; drying the grain to a moisture content sufficiently low to enable the grain to dehydrate an ethanol solution to greater than 90% ethanol, while simultaneously extracting the grain oil from the dried grain with an ethanol solution of greater than 90% ethanol, and recovering the grain oil and dehydrated alcohol from the extractant. In a preferred embodiment, cracking the grain, drying the grain to a moisture content sufficiently low to dehydrate an ethanol solution of greater than 90% ethanol while simultaneously extracting oil from the dried grain with a first ethanol solution of greater than 90% ethanol, recovering oil and dehydrated alcohol from the first extractant, extracting grain protein from the residue of step with a second ethanol solution wherein the ethanol concentration is that which maximizes the protein solubility, recovering the protein from the second extractant, recovering starch from the residue of step.

U.S. Pat. No. 5,410,021 to Kampen describes and claims a process for recovering protein, protein isolate or starch from cereal grains such as corn that utilizes wet attrition milling to break the protein-starch bonds while leaving the starch granulates intact. Kampen's process includes recovering protein from cereal grains containing starch and protein bound into a matrix by the grinding said grains to a particle size appropriate for introduction to a wet attrition mill; defatting said grain; wet attrition milling particles of said grain to a size sufficiently small to break the bond between starch and protein, then extracting the broken bond protein from the starch with at least one solvent, then separately the resulting high liquid content portion containing the extracted protein from the resulting high solids content portion containing the starch, and then subjecting the high liquid content portion containing the extracted protein to continuous cross-flow microfiltration with inorganic membranes for isolating the protein constituent, concentrating the protein constituent into a dry power.

U.S. Pat. Nos. 5,254,673 and 5,580,959 to Cook disclose extraction of zein, zein bodies, glutelins or destarched corn gluten from corn gluten veal by enzymatic starch hydrolysis with an amylase, alkaline treatment, alcohol washing and alcohol extraction to yield a starch-free, deflavored and decolored zein. The method includes the steps of removing color and flavor impurities from the gluten by treating corn gluten with alkali to remove fatty acids and corn oils contained therein and then with an aqueous alcoholic solvent having a concentration which does not substantially extract zein, zein bodies and glutelins therefrom, thereafter changing the concentration of the alcoholic solvent to a concentration sufficient to separate the gluten into decolored and deflavored zein or zein bodies and glutelin fractions.

U.S. Pat. No. 4,486,353 to Matzuzaki et al. discloses a specific process of extracting vegetable oil and fats from oleaginous raw material such as corn germ by obtaining flakes having a moisture content of from 0.7 to 10 weight % from an oleaginous raw material, said flake being characterized by the absence of an impervious outer hull or coat; contacting said flakes with an ethanol solution containing not less than 90 weight % ethanol at a temperature in the range from 70° C., to the boiling point of said ethanol solution, thereby obtaining a miscella, cooling said miscella, thereby obtaining vegetable oil or fat or both, and a separate defatted miscella; drying said defatted miscella with a molecular sieve material having a pore size from 3 Å to 4 Å, thereby obtaining a second ethanol solution wherein said second ethanol solution contains less than 7 weight % water; and using said second ethanol solution as the ethanol solution of said contacting step in a second extraction.

U.S. Pat. No. 5,773,076 to Liaw et al. is directed to a wet milling process in which gluten is recovered from steep water by membrane filtration and is then incorporated into a corn gluten meal product. The process of recovering insoluble gluten protein from steep water in a corn wet milling process includes steeping corn kernels in an aqueous solution that comprises gluten wash water, thereby producing steep water which contains insoluble gluten protein; membrane filtration of the steep water, thereby producing a retentate which has a higher concentration of the insoluble gluten protein than the original steep water; reducing the water content of the retentate; and incorporating the remaining retentate into a corn gluten meal product.

U.S. Pat. No. 5,342,923 to Takahashi et al. describes a process for refining zein with a high purity acetone solution by dispersing a solution containing crude zein into a solution comprising acetone in which said zein is insoluble; thereby precipitating a zein component as porous solids; separating said porous solids; and drying said solids.

U.S. Pat. No. 5,510,463 to Takahaski et al. discloses a process for producing zein wherein zein and pigment components are extracted from a corn gluten meal that has been treated with a $C_5$–$C_9$ hydrocarbon solvent. The zein is extracted by subjecting the treated corn gluten meal with a solvent having 91–96% by volume ethanol. The zein and the pigment components are then separated from the extract solution. Oil and fat components and pigment components may be extracted prior to the zein extraction steps.

U.S. Pat. No. 5,367,055 to Takahashi et al. discloses a process for treating a zein containing material to decrease inherent color and smell and to obtain zein by contacting the material with an aqueous acetone solution having an acetone solution which "causes almost no dissolution" of the zein compound. The process includes the steps of contacting the zein-containing material with (1) a 80–100% (V/V) acetone solution at a temperature of 25–60° C., or (2) a 70–80% (V/V) acetone solution at a temperature of 25–40° C., and separating the resulting solid from the solution.

U.S. Pat. No. 4,624,805 to Lawhon describes a process for recovering food grade protein from agricultural commodities, e.g., corn, prior to alcohol production. The process includes the steps of obtaining a suitable agricultural commodity in a form suitable for extraction of protein; extracting protein from said agricultural commodity with an alkali solution which forms a dispersion with said agricultural commodity; separating the dispersion into a solids fraction and a liquids fractions, said liquids fraction containing extracted protein; removing the protein from said liquids fractions by ultrafiltration using a membrane having a molecular weight cutoff between about 10,000 and about 30,000 daltons; and utilizing said solids fraction for alcohol production.

SUMMARY OF THE INVENTION

The process of the present invention provides a simple method for recovering zein from corn in alcohol production plants using ethanol as a solvent. Since the solvent, ethanol, is produced right at the plant, there is a plentiful supply of solvent, which is, in preferred embodiments, recovered so that there is almost no solvent waste. The process includes the steps of preparing an ethanolic zein extract by mixing a zein-containing substrate with hydrous ethanol to separate carbohydrates and other impurities from the zein fraction; removing suspended solids from the zein extract to yield a crude zein fraction; purifying the crude zein extract by contacting the crude zein extract with an adsorbent that adsorbs impurities; e.g., oil, ash, color or any remaining carbohydrates to yield a purified zein fraction, separate the adsorbent and adsorbent impurities from the zein fraction, and recovering the purified zein fraction. In preferred embodiments, the adsorbent is activated carbon.

In a preferred embodiment, prepared whole-grain corn is extracted using continuous counter current extraction with aqueous ethanol as the extraction solvent. This invention would be applied as an add-on module to an existing ethanol production facility or as an integral part of a new ethanol production facility. The method of the invention applies: (1) dry milling of tempered whole grain corn; (2) screening of the milled corn to remove fines; (3) cold flaking the screened meal; (4) extraction of zein and other corn components with a 75 percent by weight ethanol solution; (5) recovery of the ethanol solvent using water displacement so that the ethanol can be reused in the process; (6) recovery of the extracted corn flakes for use as feed stock for the ethanol plant using enzyme starch liquefaction technology to form a thinned (100 to 900 centipoises) meal slurry; (7) recovery of residual ethanol in the liquefied, extracted flakes by surface contact condensation; (8) treatment of the crude zein extract with adsorbent materials; (9) filtration of the adsorbent/extract mixture to remove the adsorbent, impurities, and color from the extract; (10) regeneration of the adsorbent for reuse in the process; (11) spray drying the refined and decolorized zein extract to produce a light to near-white zein powder containing 60 to 80 percent by weight protein; (12) recovery of the ethanol from spray drying for reuse in the process; (13) treatment of the spray dried zein product with ethanol and/or water to further refine the zein; (14) drying the refined zein to produce a white zein product containing from 85 to 99 percent by weight protein; (15) reconcentration of all dilute ethanol streams generated by the process so that the ethanol can be reused in the process as extraction solvent. Additional detail is provided in the steps below and in the attached process schematic, FIG. 1.

The invention also relates to a sliding cell extractor having a moving bed which is adapted for counter current extraction. This extractor is illustrated in FIG. 2. Extractor 1 includes a first extraction section 2 which begins in upper cell deck 1a and continues in the bottom cell deck (10a–10h) and a second extraction section 3 located in the bottom cell deck 1b (11a–11d). A transportable (sliding) cell or cell bed 4 contains the substrate from which the zein will be extracted, and transports the substrate by, e.g., a rotatable sprocket/chain mechanism, from the first to the second extraction section. First inlet pipe 10 communicates with first extraction section 2 for introducing a first solvent therein, and, similarly, second inlet pipe 11 communicates with the second extraction section 3 for introducing a second solvent therein. Recovery pipe 12 communicates with second extraction section 3 to recover the solvent that drained by gravity fed to the bottom of the extractor. Typically the recovery pipe will be located in the floor of the extractor section. In preferred embodiments, to enhance the economics of the operation, the distal end 12a of recovery pipe 12 communicates with first extraction section 2 and recycles the recovered solvent therethrough. The second solvent will usually be water so that the remaining alcohol in the substrate is recovered.

Optionally, an alcohol inlet pipe 15 communicates with recovery pipe 12a prior to the distal end of the recovery pipe 15a so that alcohol may be introduced into the recycled solvent so that the alcohol content of the recycled solvent may be adjusted to an appropriate value prior to entry into the first section. In operation, moving cell bed 4 transports the zein bearing substrate though a series of counter current extraction steps. Other counter current extractors are available and can be readily adapted for use in the process. Particularly preferred is the Lurgi SC sliding cell extractor.

In operation, hydrous ethanol is added via inlets 10a–10h in a series of counter current extraction stages such that clean ethanol containing little or no zein is added to the end of substrate bed 10a which has the lowest zein concentration and the most concentrated zein extract is added to the feed end 10h of the substrate bed, which has the highest zein concentration. Extractor 1 can add a second extraction medium in the last stages of the substrate bed such that the second medium, e.g., water, displaces the first extraction medium of hydrous ethanol to recapture the solvent for reuse in the cycle without having to dry the substrate. This optional recycling step greatly enhances the economics of this method.

The invention is described in more detail below.

BRIEF DESCRIPTION OF THE DRAWINGS

FIG. 2 is a preferred countercurrent extraction apparatus according to the present invention.

DETAILED DESCRIPTION

Figure 1:
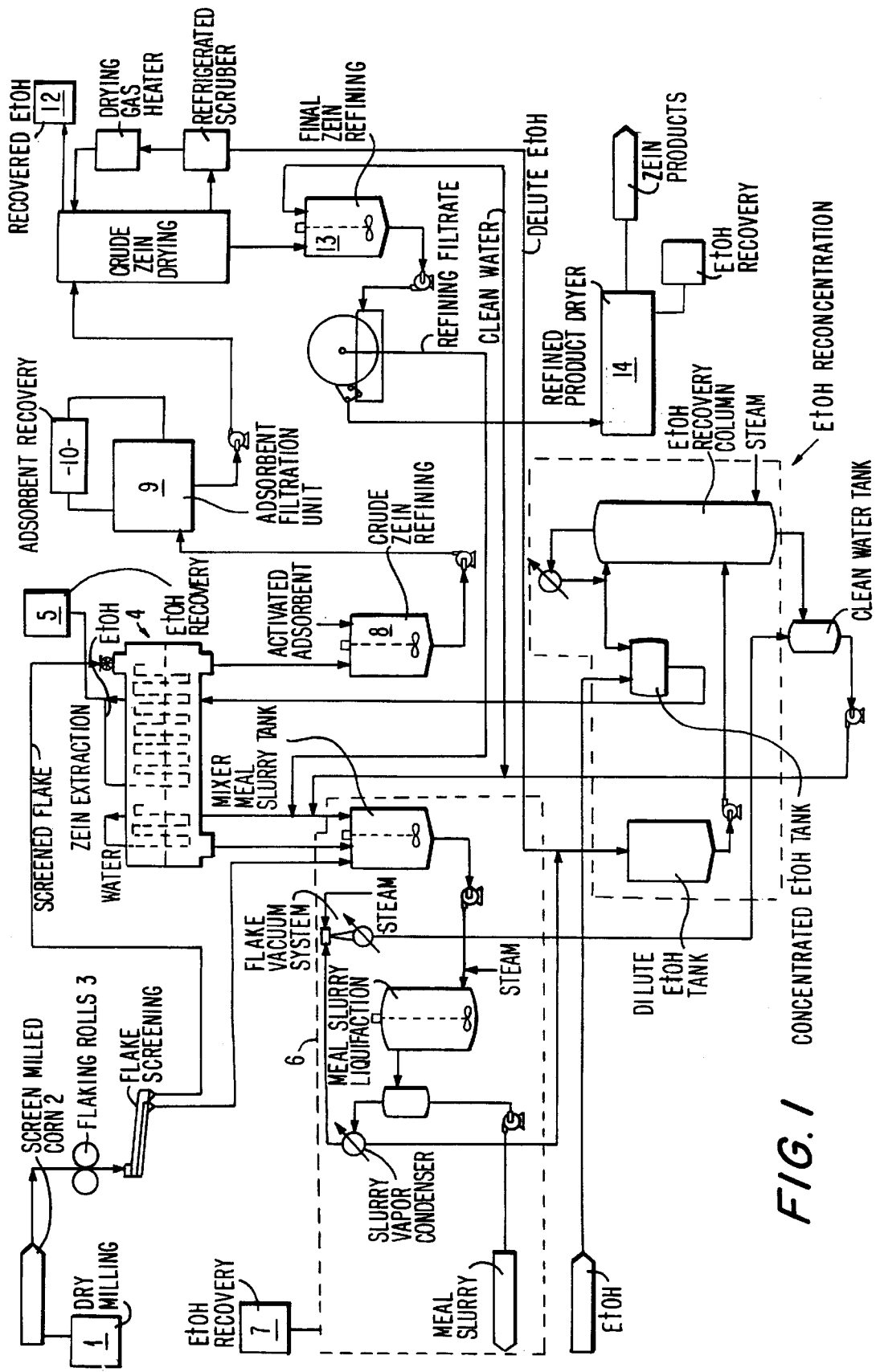
FIG. 1 is a process flow diagram of a preferred embodiment of the invention.

Zein is a protein recovered corn and other substrates such as millet (milo), rice, sorghum, and other plants that contain zein. The zein-bearing substrate may be obtained from a variety of sources, including products of dry or wet mill processes wherein alcohol is produced from corn, or even whole grain corn. All that is required is that the starting corn substrate contain zein. Preferred corn substrates include dry milled corn, particularly when flaked, and corn gluten meal, a product of the wet milling process.

In a preferred embodiment, dry milled tempered corn is the starting substrate. This substrate can be prepared by tempering corn to contain 12 to 20% by weight water. The tempered corn is then milled, e.g., with a dry impact type of mill, such as a hammer mill or a pin mill, to obtain a coarse corn meal. Such milling apparatus are typically found in ethanol production plants. It is preferred that the meal is screened to remove fines, as these may hinder the extraction process. Removal of the fines is not critical. Vibratory or gyratory screening may be used to remove the fines, which contain starch and may be routed to the mash preparation section of the ethanol production plant where for use as fermentation feed stock.

To enhance the efficiency of the extraction process, it is preferred that the coarse corn meal is rolled into thin flakes using known techniques. The flakes may be screened during this process to remove fines.

If the process is to be implemented in a wet milling process, corn gluten meal will be the typical starting substrate. Corn gluten meal is a 60 to 70% by weight protein material produced as a byproduct of corn wet milling processes to produce ethanol. In the wet milling process, corn is soaked in a warm sulfurous acid and then ground with wet attrition mills to release corn germ, corn fiber, starch and gluten so these components may be recovered separately. The germ and fiber are removed by wet screening and the remaining corn starch and gluten are separated by centrifugation. The gluten fraction is dried and sold as corn gluten meal (CGM). Most of the zein contained in whole grain corn is directed into the gluten meal co-product.

The corn substrate containing the zein is extracted with hydrous ethanol to remove a substantial portion of the zein. The components remaining in the substrate, e.g., starch, are converted to a sugar-containing slurry called mash, and routed to the adjacent alcohol plant for use as a feed stock for ethanol production. Zein extraction is accomplished by feeding the corn substrate into a suitable extractor, preferably a counter current extractor. Extraction is preferably conducted using hot, hydrous ethanol as the extraction solvent. Ethanol may be used as the solvent at concentrations ranging from 40 to 90% by weight ethanol in water, preferably between 60 and 80% and most preferably 75% by weight ethanol. The extraction may be conducted at temperatures ranging from 35 to 75° C., preferably at 49° C. This step separates zein from corn starch and other components of the subtrate.

If a counter current extractor is used, the hot solvent moves through the extractor in a number of stages counter current to the flow of the corn substrate. The zein containing solvent is discharged from the extractor after being applied to fresh substrate while the fresh solvent is applied to the substrate that has previously been extracted.

A preferred counter current extractor for use with the present invention is a multi-chamber sliding cell extractor. This type of extractor includes a plurality of moving compartments or cells that are pulled continuously through two or more separate chambers in which different solvent media can be applied to the substrate being extracted. The cells are formed from three-sided segments that are attached to and pulled by two or more conveyor chains. The chained segments are driven and guided by sprockets at either end of the extraction device. One sprocket is motor driven while the other is non-powered and serves as a guideing mechanism for the moving cells.

The substrate to be extracted is contained in the moving cells and the solvent is applied to the substrate through fixed nozzles in the tops of the separate extraction compartments as required by the operation. The floor of the moving cells is formed by a fixed, slotted deck which runs the length of each extraction chamber. The moving cells are formed when each chained segment moves around the sprockets and intersects the fixed, slotted deck and the preceding segment.

Top and bottom extraction chambers of the extractor are formed by fixed walls and by top and bottom slotted decks. Each slotted deck is drained by several separated drainage pans, with one drainage pan employed in each stage of the extractor. Each pan drains into a separate fixed tank so that the extract from each stage can be physically separated, thereby becoming a unique extraction stage in the counter current extractor unit.

Each moving cell is filled with substrate as it passes under the top feed mechanism of the extractor unit. The extracted substrate is discharged at the bottom discharge mechanism of the extractor unit. Solvent or displacement medium is applied to the substrate through fixed nozzles located above the moving cells and is drained away through the slotted deck that forms the fixed floor. The moving cells slide over the fixed floor, hence the name, sliding cell extractor.

In accordance with the present invention, hydrous ethanol solvent is applied in the upper extraction chamber of the extractor and in about one third to one half of the bottom extraction chamber while displacement water is applied in the remaining area of the bottom chamber. This unique arrangement allows recovery of most of the ethanol solvent before the substrate is discharged from the extractor, which, in turn, provides enhanced economics for the operation because the solvent is not lost and does not have to be recovered from a dilute vapor stream.

It is preferred that the resultant crude zein extract is then preferably clarified to remove suspended solids by filtration or by centriftigation, particularly if corn gluten meal is used as the starting substrate. The solids separated by clarification may be washed with water to remove any residual ethanol. The recovered solids can then be returned to the ethanol production facility operation for incorporation into feed stocks or co-products. The dilute ethanol from the washing operation is routed to the ethanol recovery system in the zein operation.

To increase overall yield, the ethanol solvent is displaced from the extracted corn substrate so that the residual ethanol in the extracted substrate is recovered to the process. This displacement is preferably performed in the final stages of the extractor and, in preferred embodiments, is an integral part of the construction of the extractor, as in the preferred apparatus described above.

The extracted substrate may optionally be mixed with water and treated with an amylase enzyme and, if necessary, stabilizers, to liquefy any starch remaining in the corn substrate. The enzyme digestion step can be accomplished using art know techniques (See, e.g., Shetty, J. K. and Allen, W. G., *An Acid-Stable, Thermostable Alpha Amylase for Starch Liquefication*, Cereal Foods World, November, 1988). If this optional step is used, the substrate is converted to a thinned slurry that can be pumped back to the ethanol plant for use as fermentation feed. The thinned slurry will typically have a viscosity to 100 to 900 centipoises, which can be optimized.

The extracted substrate may contain sufficient ethanol solvent to make recovery of the ethanol contained in the extracted substrate desirable. The residual ethanol can be recovered, e.g., by condensing the vapor from the liquefaction operation with a surface contact condenser. The condensed vapor is then routed to the ethanol concentration system for reuse in the process or for purification and recovery.

The result of the extraction process is a crude zein extract that generally contains about 23% by weight water, 69 percent by weight ethanol and 8 percent by weight dissolved solids composed of 4–5 percent by weight zein protein and 4–5 percent by weight of a mixture of carbohydrate, oil, ash and color. A significant fraction of these impurities may be removed from the extract to subsequently produce a higher protein product with much lighter color. It has been found that treating the zein dispersion with an adsorbent that removes at least one of carbohydrates, oils, ash, and color is a simple and effective way to yield a purified zein product. The adsorbents used remove the impurities by adsorbing the impurities without adsorbing zein. The adsorbents may be natural or synthetic. A non-limiting list of adsorbents which may be in used in accordance with the present invention include activated carbon, activated charcoal, granular activated carbon, bentonite bleaching clay, diatomaceous earth, and structured synthetic resin. Activated carbon is preferred, and is added in amounts ranging from 0.5% by weight to 2.5% by weight of the crude zein extract from the extraction operation.

The adsorbent is then separated from the zein containing extract to recover a purified zein dispersion. The resultant purified zein dispersion will preferably contain approximately 60 to 80% by weight (dry substance basis) zein protein. Filtration to remove the adsorbent may be accomplished by fine filtration or by cross-flow filtration, to retain particles as small as 1 to 5 microns in diameter. The filtration step also removes almost all of the color, oil and free fatty acids along with suspended carbohydrates to yield a zein dispersion that is clear and water white.

The resultant zein dispersion can then be directly used in other process, e.g., in the manufacture of biodegradable zein resin. Alternatively, the purified zein dispersion can be further processed, e.g., dried, to yield a solid zein product.

For an efficient process, it is preferred that the adsorbent is regenerated for reuse in the process. This may be accomplished by known techniques, such as washing the adsorbent with anhydrous ethanol and heating to remove the residual ethanol.

In a preferred embodiment, the purified zein extract is spray dried to produce a dry powder. The dried product is light yellow to near-white in color depending on the degree of refining prior to drying. Spray drying is preferably performed in an inert gas blanketed dryer to provide a safe operation, using steam heat.

It is preferred that spray drying be performed in a closed-loop dryer that is equipped with an ethanol vapor condensation system so that the ethanol solvent is recovered for reuse in the process.

The spray dried zein may be further treated with ethanol and/or water to remove any is impurities which may be found in the product. In a preferred embodiment, the zein is treated to yield a purified white zein product, which is then dried to remove any residual ethanol and/or water. This final product is a white zein product with a purity of between 85 to 99% protein. It has been surprisingly found that use of water alone during this last purification process provides a surprisingly pure zein product.

At every step along the process, it is preferred that the dilute ethanol streams generated by extracting and refining the zein are re-concentrated and reused in the process or are otherwise receeovered. Ethanol re-concentration may be performed using a single-column distillation unit which concentrates the diluted alcohol feed to 85 to 93 percent by weight ethanol, which is then reused in the extractor. The water from the dilute ethanol streams is discharged from the bottom of the column and is may be returned for use, e.g., as a dilution medium for preparing a thinned fine meal slurry which is returned to the fermentation portion of the plant.

The invention also relates to a sliding cell extractor having a moving bed which is adapted for counter current extraction. A preferred extractor is shown in FIG. 2. Extractor 1 includes a first extraction section 2 and a second extraction section 3. A transportable (sliding) cell or cell bed 4 contains the substrate from which the zein will be extracted, and transports the substrate by, e.g., a rotatable sprocket/chain mechanism, from the first to the second extraction section. First inlet pipe 10 communicates with first extraction section 2 for introducing a first solvent therein, and, similarly, second inlet pipe 11 communicates with the second extraction section 3 for introducing a second solvent therein. Recovery pipe 12 communicates with second extraction section 3 to recover the spent solvent that is gravity fed to the bottom of the extractor. Typically the recovery pipe will be located in the floor of the extractor section. In preferred embodiments, to enhance the economics of the operation, the distal end 12a of recovery pipe 12 communicates with first extraction section 2 and recycles the recovered solvent therethrough. Typically, the second solvent will be water to recover the alcohol remaining in the substrate after exiting the first extraction section.

Optionally, an alcohol inlet pipe 15 communicates with recovery pipe 12 prior to the distal end of the recovery pipe 12a so that alcohol may be introduced into the recycled solvent so that the alcohol content of the recycled solvent may be adjusted to an appropriate value prior to entry into the first section. In operation, moving cell bed which transports the zein bearing substrate though a series of countercurrent extraction steps. Other types of commercially available counter current extractors can be adapted to include the countercurrent features described above; particularly preferred is the Lurgi SC sliding cell extractor.

In operation, hydrous ethanol is added via inlets 10 and 11 in a series of counter current extraction stages such that clean ethanol containing little or no zein is added to the end of substrate bed 4 which has the lowest zein concentration and the most concentrated zein extract is added to the feed end 1a of substrate bed 4, which has the highest zein concentration. Extractor 1 can add a second extraction medium in the last stages of the substrate bed such that the second medium, e.g., water, displaces the first extraction medium of hydrous ethanol to recapture the solvent for reuse in the cycle without having to dry the substrate. This optional recycling step greatly enhances the economics of this method.

The invention will now be described in more detail below. The examples are illustrative and not limitative of the invention.

DETAILED DESCRIPTION OF PREFERRED EMBODIMENTS

EXAMPLE 1

Preparation of Crude Zein

Corn was processed into a coarse meal by mechanical milling. The corn was then heated to 50° C. to improve plasticity and passed through a roller mill to produce whole corn flakes. The whole corn flakes were fed into a continuous counter current extractor where the flakes were extracted with 70% by weight hydrous ethanol. Zein protein was extracted by the hydrous ethanol along with smaller portions of other corn components. The zein extract was collected and filtered to remove suspended solids. The filtered extract had a solids concentration of 3.7% by weight. The filtered zein extract was fed through a spray atomizing nozzle into an inert gas blanketed spray dryer. The dried product was a yellow powder that contained 5% moisture and 54% protein on a dry substance basis. The yellow powder had a slightly sweet taste and would not form a clear suspension when mixed with 90% by volume ethanol.

EXAMPLE 2

Preparation of Refined Zein

Whole corn was tempered to 18–20% moisture by the addition of water, which the corn absorbed. The tempered corn was then passed through an impact milling device that was configured as a standard commercial hammer mill. The milled corn was screened through a 26 mesh rotary screen to remove fine materials generated by milling. The coarse meal retained by the 26 mesh screen was then passed through a cold rolling mill to convert the meal to thin flakes. The flakes were screened a second time to remove residual fine materials generated by roll milling. The screened flakes were fed into a continuous counter current extractor as in Example 1. The flakes were extracted with 75% by weight hydrous ethanol. Zein protein was extracted by the hydrous ethanol along with smaller portions of other corn components. The zein extract was clarified by filtration. The resulting clarified crude zein contained 5.5% by weight solids on a dry substance basis. The clarified zein extract was treated with activated carbon at 1% carbon by weight based on the total solution weight. The carbon was added to the crude zein slurry and agitated to keep the carbon suspended. During treatment, the carbon adsorbed color, odors, oils and fatty acids from the crude zein extract. The carbon was then filtered out of the mixture carrying with it the color, odors, oils and fatty acids that had been adsorbed. The filtered liquid was clear and water-white. The clear solution was dried to produce a fine, white zein product. The dried white powder easily re-dissolved in 90% by weight ethanol to form a clear alcohol mixture suitable for barrier film forming and for other applications. The white zein powder was then added to clean water at a rate of 1 part dry powder to 5 parts clean water. The resulting dispersion was then filtered and the filter cake washed with additional water. The white filter cake was dried to produce a slightly off-white powder that contained 92% protein on a dry substance basis. This powder easily re-dissolved in 90% by volume ethanol forming a clear zein dispersion suitable for barrier film forming and for most other applications which require light colored zein. Alternate methods for refining the crude zein were attempted including treating the extract with bentonite bleaching clay and solvent refining of the crude zein extract. Alternate methods were successful in reducing color and increasing the protein content of the zein product, but the use of activated carbon was found to be the most effective to reduce color and increase protein content and yielded the best zein product.

We claim:

1. A method of recovering zein protein from flaked corn comprising the steps of:

(a) extracting flaked corn with a 60–80% aqueous ethanol solution by weight ethanol to separate zein protein from other solid components;

(b) removing solid components to yield a crude zein-containing alcoholic dispersion;

(c) contacting the crude zein dispersion with activated carbon for a time and under conditions effective to adsorb at least one of starch, color, oil and fatty acid;

(d) removing the activated carbon from the crude zein dispersion along with adsorbed impurities to yield a purified zein dispersion; and (e) recovering the zein protein from the purified zein dispersion.

2. A method of recovering zein protein from flaked corn comprising the steps of: sequentially (a) extracting flaked corn with ethanol to separate zein protein from other solid components;

(b) removing solid components to yield a crude zein alcoholic dispersion;

(c) contacting the crude zein dispersion with activated carbon for a time and under conditions effective to adsorb at least one of starch, color, oil and fatty acid;

(d) removing the activated carbon along with adsorbed impurities to yield a purified zein dispersion; and (e) spray drying the purified zein dispersion to yield the zein protein in dry form.

* * * * *

UNITED STATES PATENT AND TRADEMARK OFFICE
CERTIFICATE OF CORRECTION

PATENT NO. : 6,610,831 B1
DATED : August 26, 2003
INVENTOR(S) : Jerel McInnis and Qingnong Tang It is certified that error appears in the above-identified patent and that said Letters Patent is hereby corrected as shown below:

<u>Title page,</u>
Item [73], Assignee, change "Ltd." to -- Inc. --

Signed and Sealed this

Twenty-seventh Day of January, 2004

JON W. DUDAS
*Acting Director of the United States Patent and Trademark Office*